(12) United States Patent
Pinkerton et al.

(10) Patent No.: US 7,794,009 B2
(45) Date of Patent: Sep. 14, 2010

(54) SIDE IMPACT DOOR TRIM BUCKLE INITIATORY DESIGN IN ARMREST AND GRAB HANDLE REGION

(75) Inventors: John Pinkerton, Canton, MI (US); Ian Brewster Hall, Ann Arbor, MI (US); Ammad Bhatti, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 234 days.

(21) Appl. No.: 11/946,524

(22) Filed: Nov. 28, 2007

(65) Prior Publication Data
US 2009/0134660 A1 May 28, 2009

(51) Int. Cl.
*B60J 9/00* (2006.01)
(52) U.S. Cl. ...................... 296/153; 296/1.09
(58) Field of Classification Search ........... 296/153, 296/187.05, 1.09; 280/748; 297/411.21, 297/411.45
See application file for complete search history.

(56) References Cited
U.S. PATENT DOCUMENTS

| 3,387,881 | A | 6/1968 | Stepanek et al. |
| 5,026,111 | A | 6/1991 | Hewko |
| 5,171,058 | A | 12/1992 | Ishikawa |
| 5,290,087 | A | 3/1994 | Spykerman |
| 5,445,430 | A | 8/1995 | Nichols |
| 5,527,084 | A | 6/1996 | Scherf |
| 5,531,499 | A | 7/1996 | Vecchio et al. |
| 6,213,538 | B1 * | 4/2001 | Scheidmantel et al. ...... 296/153 |
| 6,568,743 | B1 | 5/2003 | Jayasuriya et al. |
| 6,742,830 | B2 | 6/2004 | Zimmerman et al. |
| 7,222,910 | B1 * | 5/2007 | Doan et al. ............. 296/153 |

* cited by examiner

*Primary Examiner*—Lori L Lyjak
(74) *Attorney, Agent, or Firm*—Shook, Hardy & Bacon LLP (57) ABSTRACT

A side impact door trim buckle initiator design is provided in a vehicle armrest and grab handle region. The disclosed support structure design induces buckling in the door handle supports while continuing to provide acceptable durability and strength. Two modifications to the door armrest and grab handle structures are made. First, an angled section is added to the material flow strap of the armrest supporting structure to promote buckling. This approach overcomes the difficulty of known material flow straps which tend to be horizontal, thus introducing a strong compressive load path. By adding an angle to the flow straps the vertical motion is forced upon a lateral impact. Second, vertical components of the door handle support structure are removed while a buckle initiator in the door handle support is added.

16 Claims, 8 Drawing Sheets

SIDE IMPACT DOOR TRIM BUCKLE INITIATORY DESIGN IN ARMREST AND GRAB HANDLE REGION

TECHNICAL FIELD

The present invention relates generally to collapsible door structures for use with vehicle doors. More particularly, the present invention relates to collapsible door trim buckle initiator design in the armrest and grab handle region of the vehicle door. The collapsible door structures are strong and durable under normal use but demonstrate compromised lateral stiffness in the event of a side impact.

BACKGROUND OF THE INVENTION

Side impact events in vehicles have been identified as one of the top priorities for both research and regulation with government requirements continuing to become more stringent. These additional requirements make designs for door trim systems more challenging because they may impact the door trim at the door armrest supports and at the grab handle. It is known in vehicles to provide an armrest in a door typically having an integrated grab handle to allow the occupant to pull the door shut. According to known arrangements, the door armrest and grab handle are generally anchored to the vehicle door inner panel by a variety of structures. In addition to being anchored to the vehicle door inner panel, the grab handle is also solidly connected to the armrest substrate. This makes the area surrounding the grab handle quite stiff, which may negatively affect occupant injury results.

The known approaches to anchoring the armrest and door grab handle provide a good degree of lateral door function to the vehicle occupant while opening and, particularly, closing the door. Accordingly, a reduction in stiffness of the door trim panel in this area may improve side impact performance. But until now no solution has been available to this problem without compromising armrest and grab handle tensile and vertical strength.

Accordingly, as in so many areas of vehicle technology, there is room in the art of vehicle door design for an alternative configuration to known door armrest and door grab handle and adjacent support structures. The alternate configurations should allow the translation of horizontal force impacting the vehicle door in the event of an impact to vertical movement which deforms or buckles a portion of the armrest substrate to thereby prevent or minimize the movement of the armrest and its associated structure vehicle inward into the passenger area.

SUMMARY OF THE INVENTION

The present invention provides alternative arrangements to known vehicle door armrest and grab handle support structure designs. According to the present invention, a support structure design is provided which induces buckling in the door handle supports while continuing to provide acceptable durability and strength. To accomplish this two modifications to the door armrest and grab handle structures are made. First, an angled or curved section is added to the material flow strap of the armrest supporting structure to promote buckling. This approach overcomes the difficulty of known material flow straps which tend to be horizontal, thus introducing a strong compressive load path. By adding an angle to the flow straps the vertical motion is forced upon a lateral impact. Second, vertical components of the door handle support structure are removed while a buckle initiator in the door handle support is added.

This vertical motion contacts a buckle-line designed into the armrest substrate. This arrangement effectively provides the use of a secondary load path to pre-buckle the primary load path, insuring that the buckle will start a location defined by the buckle initiator, thus controlling the buckle and its development. By designing the armrest to buckle a reduction in the compressive strength is realized, while providing a load path for tensile forces.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the figures, the same reference numerals will be used to refer to the same components. In the following description, various operating parameters and components are described for different constructed embodiments. These specific parameters and components are included as examples and are not meant to be limiting.

Figure 1:
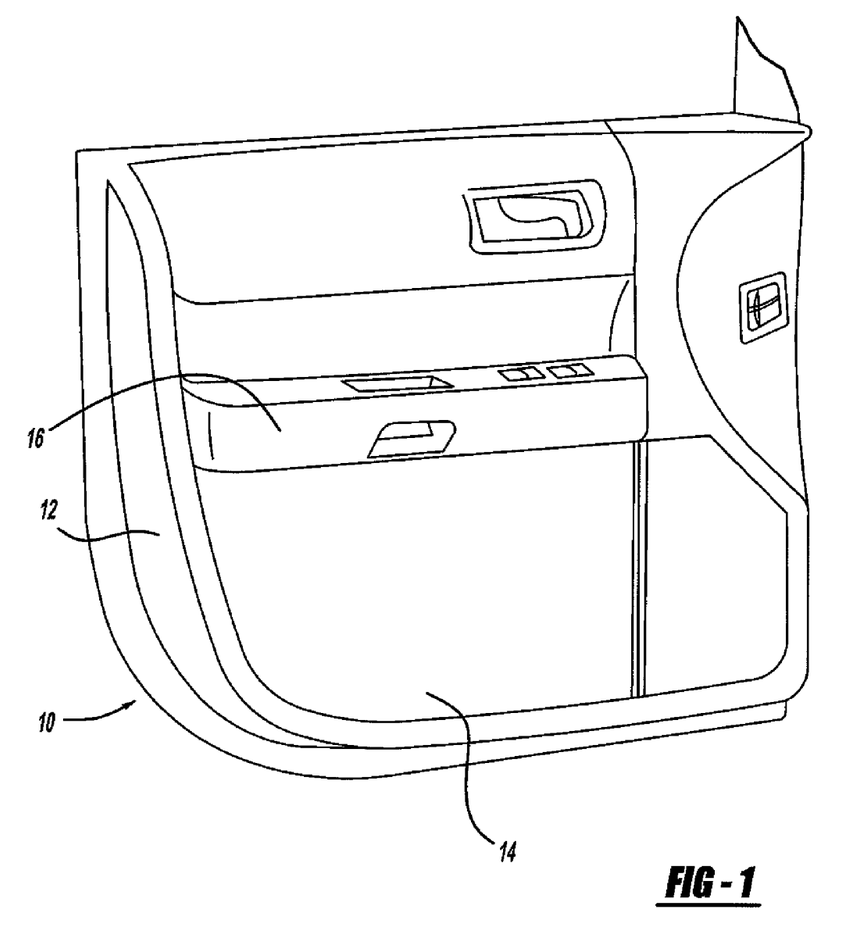
FIG. 1 illustrates a perspective view of a door assembly viewed from the inside of the vehicle having a trim buckle initiator configuration according to the present invention.

With reference to FIG. 1, a perspective view of a door assembly of the present invention, generally illustrated as 10, is shown. The door assembly 10 includes a frame 12, an interior panel 14, and an armrest and grab handle assembly 16. It is to be understood that the configuration of the door assembly 10 shown in FIG. 1 is for illustrative purposes only and is not intended as being limiting. Particularly, the armrest and grab handle assembly 16 could be configured differently in terms of shape, size and overall configuration as well as in terms of placement of the grab handle itself.

Figure 2:
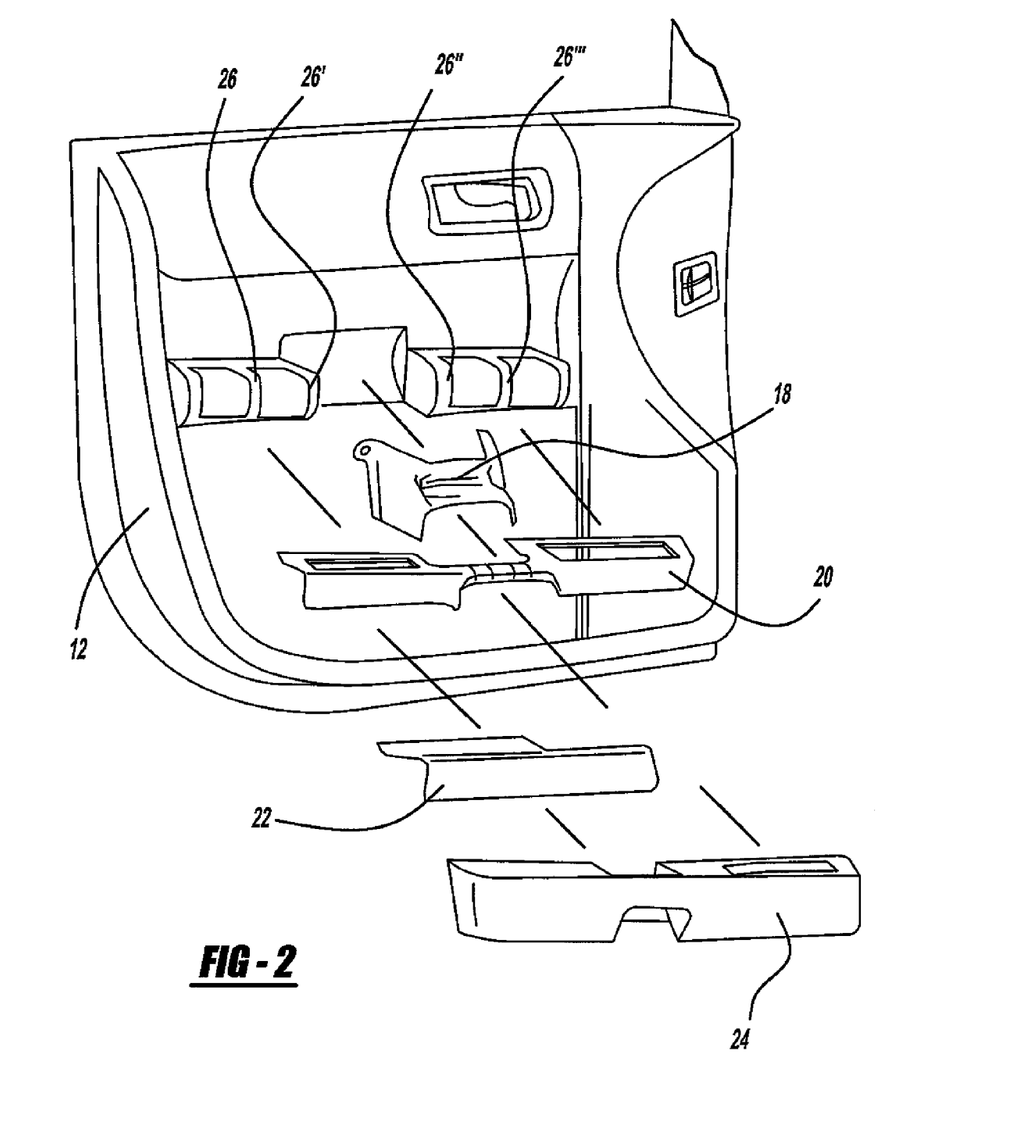
FIG. 2 illustrates a perspective exploded view of the door frame, the grab handle back side plate, the armrest substrate, the energy-absorbing foam backing, and the armrest cover.
Figure 3:
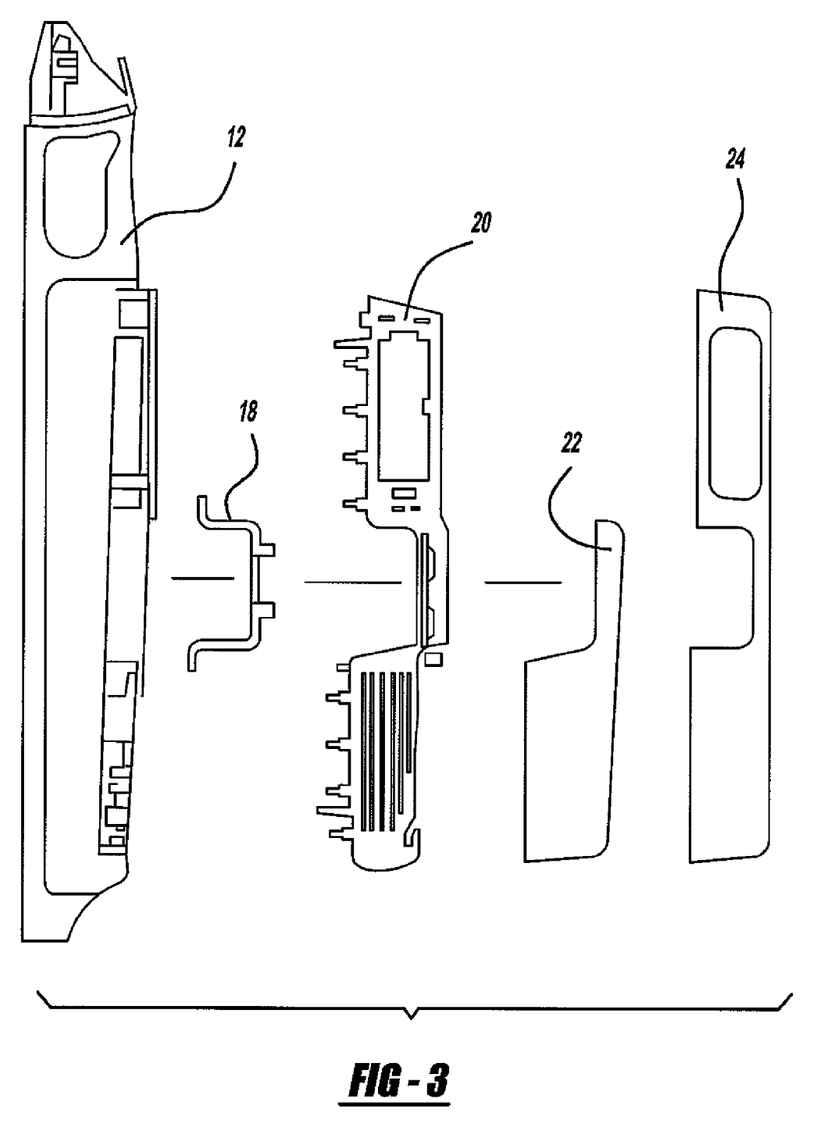
FIG. 3 illustrates a plan exploded view of the elements of FIG. 2.

With reference to FIGS. 2 and 3, exploded views of the door assembly 10 are illustrated. The door assembly 10 includes the door frame 12, a grab handle back side plate 18, an armrest substrate 20, an energy-absorbing foam backing 22, and an armrest cover 24. The energy-absorbing foam backing 22 is of known construction, as is the armrest cover 24 which may be of vinyl or another polymerized material as preferred and as is known in the art.

The door frame 12 includes a plurality of material flow straps 26, 26', 26" and 26'" to which the armrest substrate 20 is attached. The number and placement of the flow straps 26, 26', 26", 26'" . . . can be modified and adapted as required. However, according to the disclosed invention, the construction of the material flow straps 26, 26', 26", and 26'" is modified to allow them to buckle under compressive load.

Figure 4:
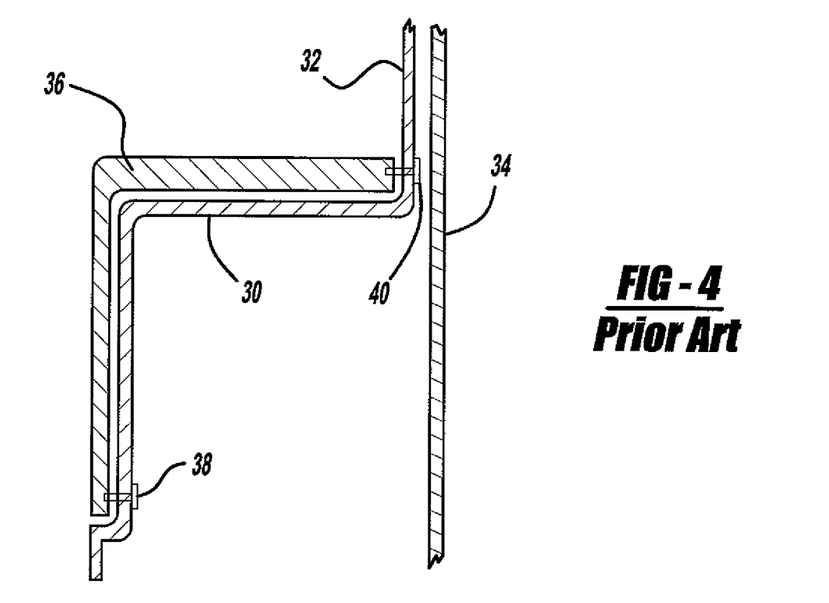
FIG. 4 illustrates a sectional view of a conventional material flow strap assembly.

A known material flow strap and associated elements are illustrated in FIG. 4. With reference to that figure, a conventional material flow strap 30, having an horizontal arm, is shown. The material flow strap 30 is continuous with a door trim substrate 32. The door trim substrate 32 is adjacent a door inner sheet metal 34.

A door handle support 36 is filled over the material flow strap 30 in a known manner and is fastened thereto by a first heat stake 38 and a second heat stake 40. In the event of an impact situation the substantially horizontal portion of the material flow strap 30 may force the associated elements vehicle inward.

Figure 5:
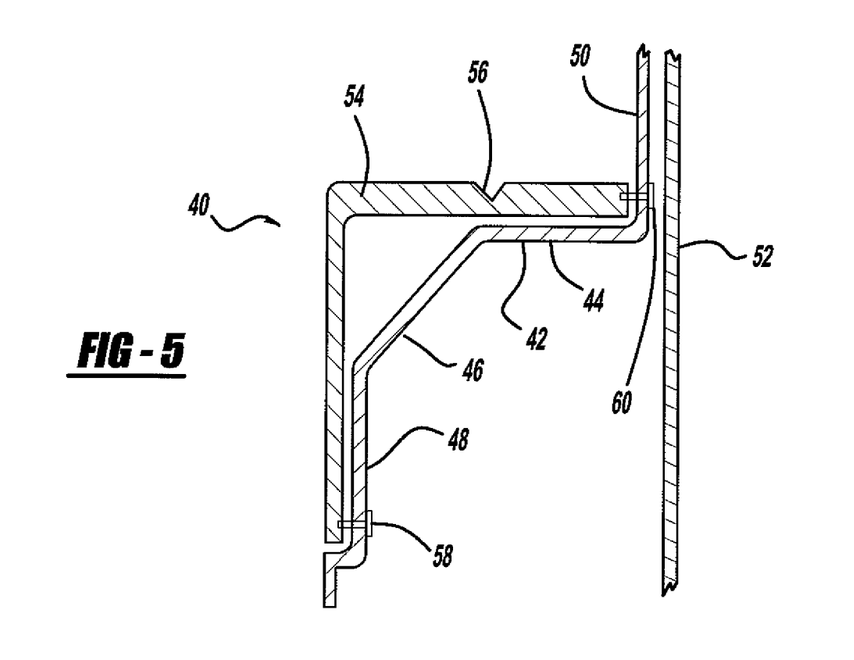
FIG. 5 illustrates a sectional view of a material flow strap assembly according to the disclosed invention shown in its pre-impact state.
Figure 6:
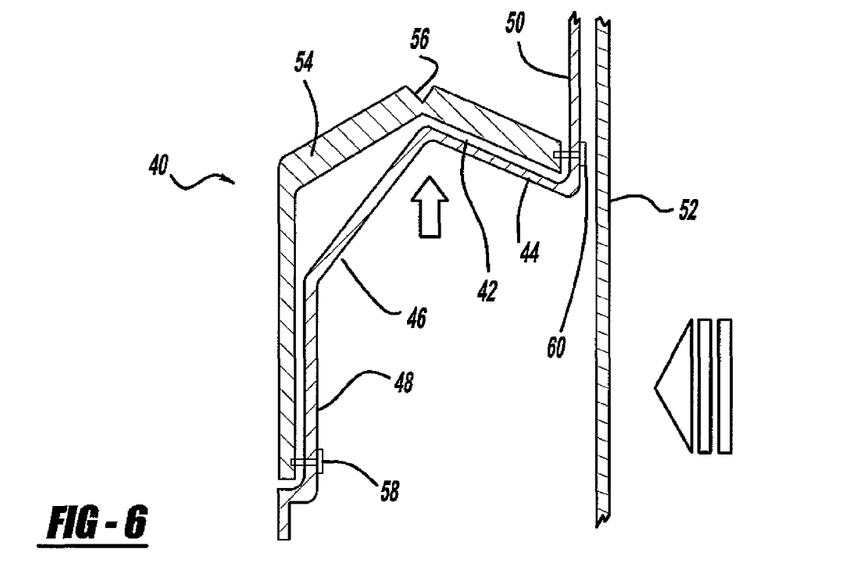
FIG. 6 illustrates a sectional view of the material flow strap assembly of FIG. 5 illustrated in its post-impact state.

To improve on the situation possibly posed by the prior art, the material flow strap has been modified so that it buckles under compressive load. This structure is shown in FIGS. 5 and 6. In FIG. 5 a sectional view of a supporting structure, generally illustrated as 40, is shown. The supporting structure 40 includes a material flow strap 42 having a substantially horizontal portion 44, an angled portion 46, and a substantially vertical portion 48. The substantially horizontal portion 44 is continuous with a door trim substrate 50. Adjacent the door trim substrate 50 is a door inner sheet metal 52.

Fitted to the material flow strap 42 is a door handle support 54 having a buckling initiator 56 formed therein. The buckling initiator 56 may be formed from a variety of methods, such as notching or slotting. The door handle support 54 is attached to the material flow strap 42 by a number of methods, such as by heat staking. As illustrated, attachment has been made by a heat stake 58 and by a heat stake 60.

The supporting structure 40 is illustrated in FIG. 5 as the arrangement would appear prior to an impact event. In FIG. 6, the arrangement is illustrated after the impact event. As is shown, the material flow strap 42 has buckled between the substantially horizontal portion 44 and the angled portion 46. The buckling initiator 56 allows the substantially vertical movement of the material flow strap 42 and begins buckling in a specific, controlled location. By effecting upward, buckled movement of the material flow strap 42 and the door handle support 54, the movement of the supporting structure and the lateral compressive stiffness is reduced.

Figure 7:
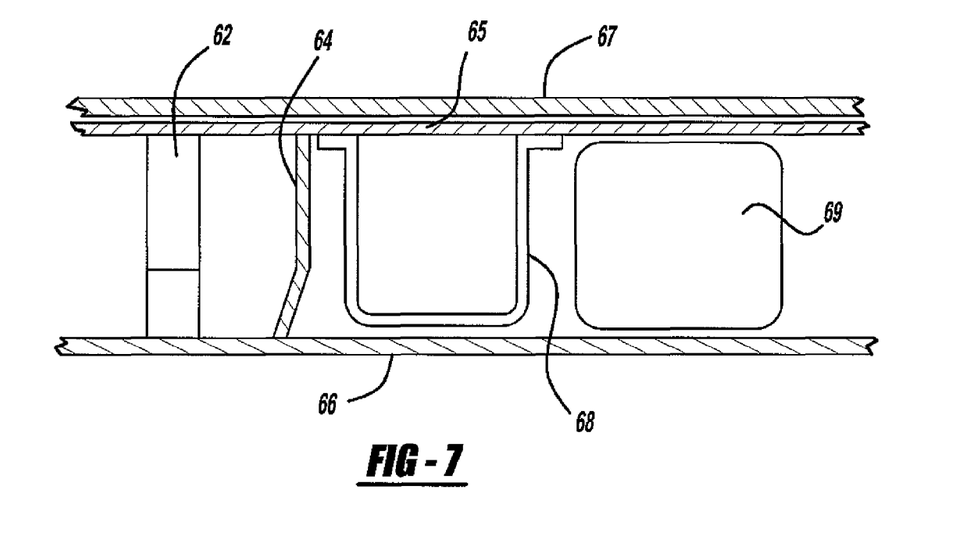
FIG. 7 illustrates a top sectional view of a portion of an armrest substrate according to an alternate embodiment of the disclosed invention prior to impact.
Figure 8:
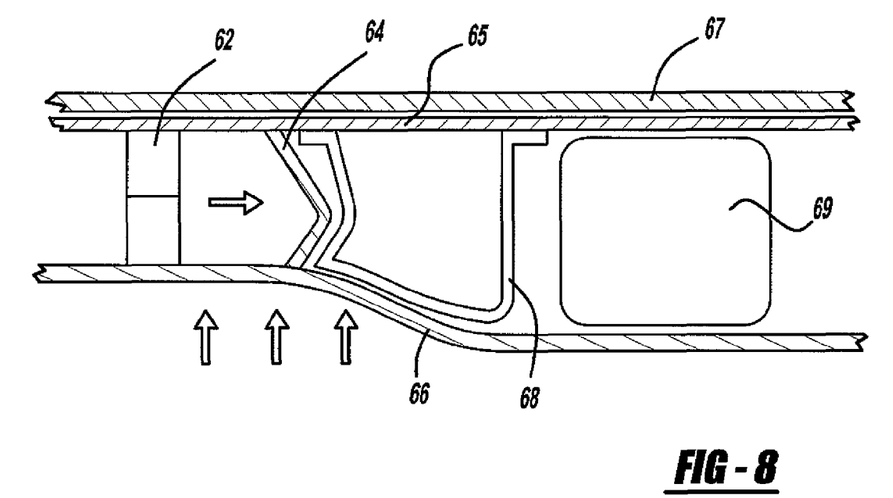
FIG. 8 illustrates the same view as shown in FIG. 7 but after a side impact.

An alternative arrangement for material flow straps is illustrated in FIGS. 7 and 8. With reference first to FIG. 7, an angled material flow strap 62 formed as set forth above in FIGS. 5 and 6 is provided and is shown prior to an impact event. Adjacent the angled material flow strap 62 is another angled material flow strap 64 which is provided at an angle which is generally perpendicular to the angled material flow strap 62. Both the angled material flow strap 62 and the angled material flow strap 64 are fixed between a first portion of a door trim substrate 65 and a second portion of a door trim substrate 66. A door inner sheet metal 67 is adjacent the first portion of the door trim substrate 65. A handle closeout 68 is formed adjacent the angled material flow strap 64. A switch area 69 is formed beside the handle closeout 68.

The arrangement of FIG. 7 is shown after an impact event in FIG. 8. As illustrated, both the angled material flow strap 62 and the angled material flow strap 64 are shown as having partially collapsed as has the handle closeout 68. The impact energy is distributed away from the vehicle occupant and along the longitudinal axis of the vehicle through the armrest substrate and associated areas.

Figure 9:
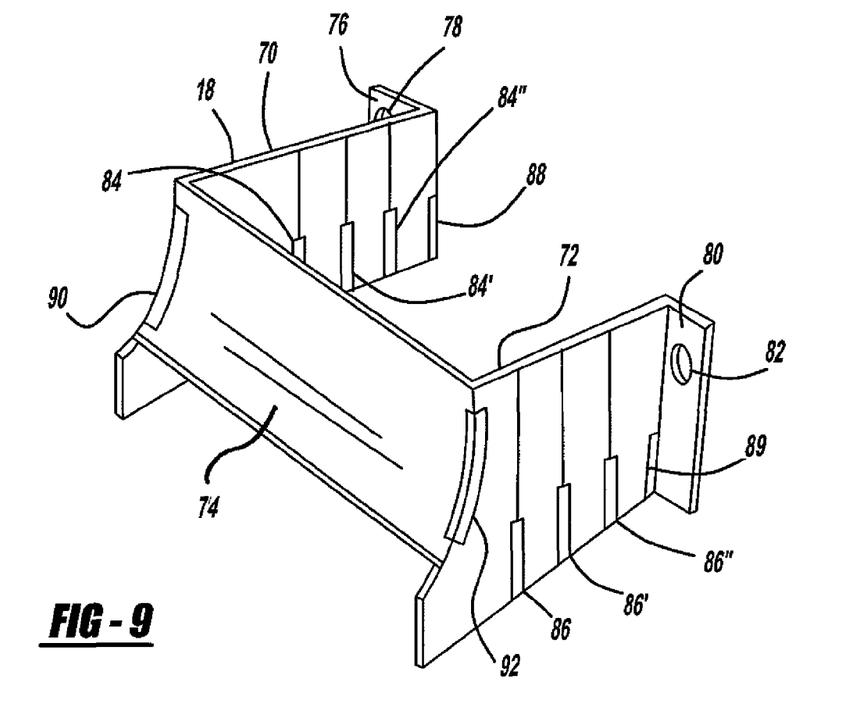
FIG. 9 illustrates a perspective view of the grab handle back side plate of the disclosed invention.

The invention disclosed herein also provides a modification to the grab handle back side plate 18. This modification is illustrated in FIG. 9 in which the grab handle back side plate 18 is shown in perspective view. The grab handle back side plate 18 includes a pair of spaced apart side arms 70 and 72 which are joined by a curved bridge piece 74. At the end of the side arm 70 is provided an attachment flange 76 having a door handle closeout attachment point 78. At the end of the side arm 72 is provided an attachment flange 80 having a door handle closeout attachment point 82.

In the event of a side impact event the rigid grab handle back side plate, as is known in the art, may be driven vehicle inward. To provide a potentially improved response, a plurality of buckling initiators are provided along each of the side arms 70 and 72. Buckling initiators 84, 84', and 84" are formed perpendicular to the long axis of the side arm 70. Buckling initiators 86, 86' and 86" are formed perpendicular to the long axis of the side arm 72. Each of the buckling initiators 84, 84', 84", 86, 86', and 86" may be formed by notching, slitting or by any other known technique. An additional buckling initiator 88 may be formed at the corner of the side arm 70 and the attachment flange 76. An additional buckling initiator 89 may also be formed at the corner of the side arm 72 and the attachment flange 80. Furthermore, a buckling initiator 90 may be formed at the corner of the side arm 70 and the curved bridge piece 74. An additional buckling initiator 92 may be formed at the corner of the side arm 72 and the curved bridge piece 74.

Figure 10:
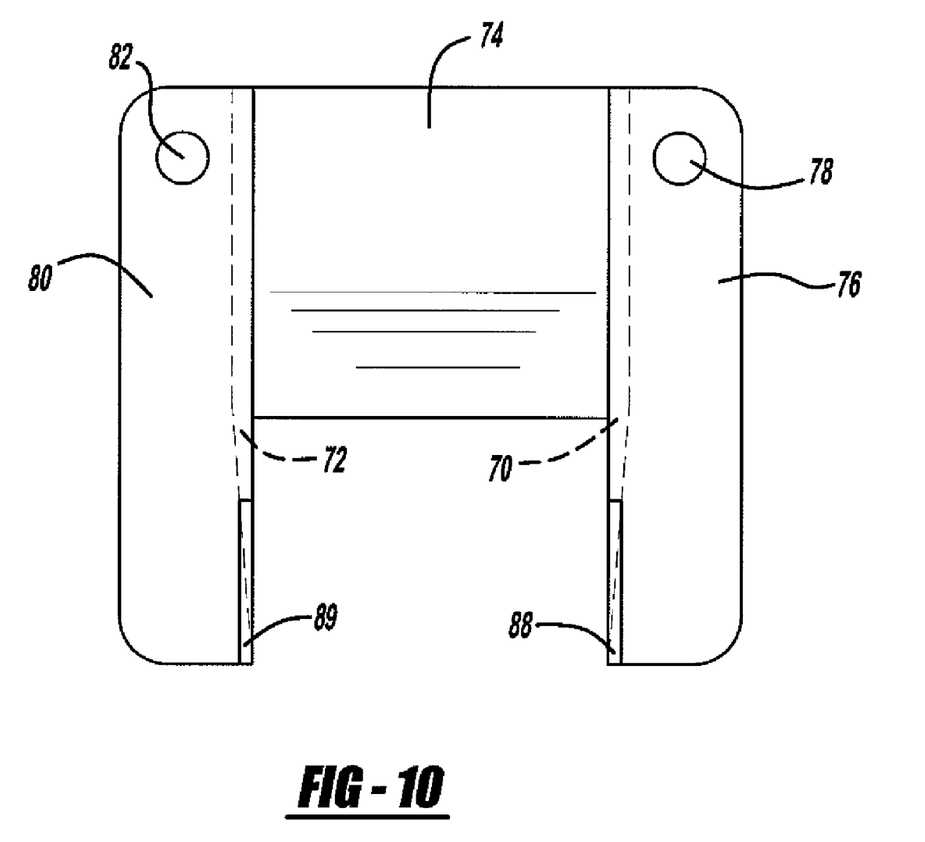
FIG. 10 illustrates a lateral view of the grab handle back side plate of the disclosed invention.

FIG. 10 is a lateral view of the grab handle back plate 18 looking inward towards the center of the vehicle. This view illustrates the change in the thicknesses of the walls 70 and 72 over their respective vertical heights. The walls 70 and 72 are shown in broken lines at their attachment points to the attachment flanges 76 and 80 respectively. The thickness varies in order to accept tensile loads between the curved bridge piece 74 and the door handle closeout attachment points 78 and 82 during closing, while insuring that non-load bearing portions of the side walls 70 and 72 are effectively non-structural.

In addition to modifications being made to the material flow straps and to the grab handle back side plate as discussed above and shown in the related figures, further controlled buckling of the vehicle armrest can be established by making appropriate changes to the configuration of the armrest substrate. Such modifications are shown in FIG. 11.

Figure 11:
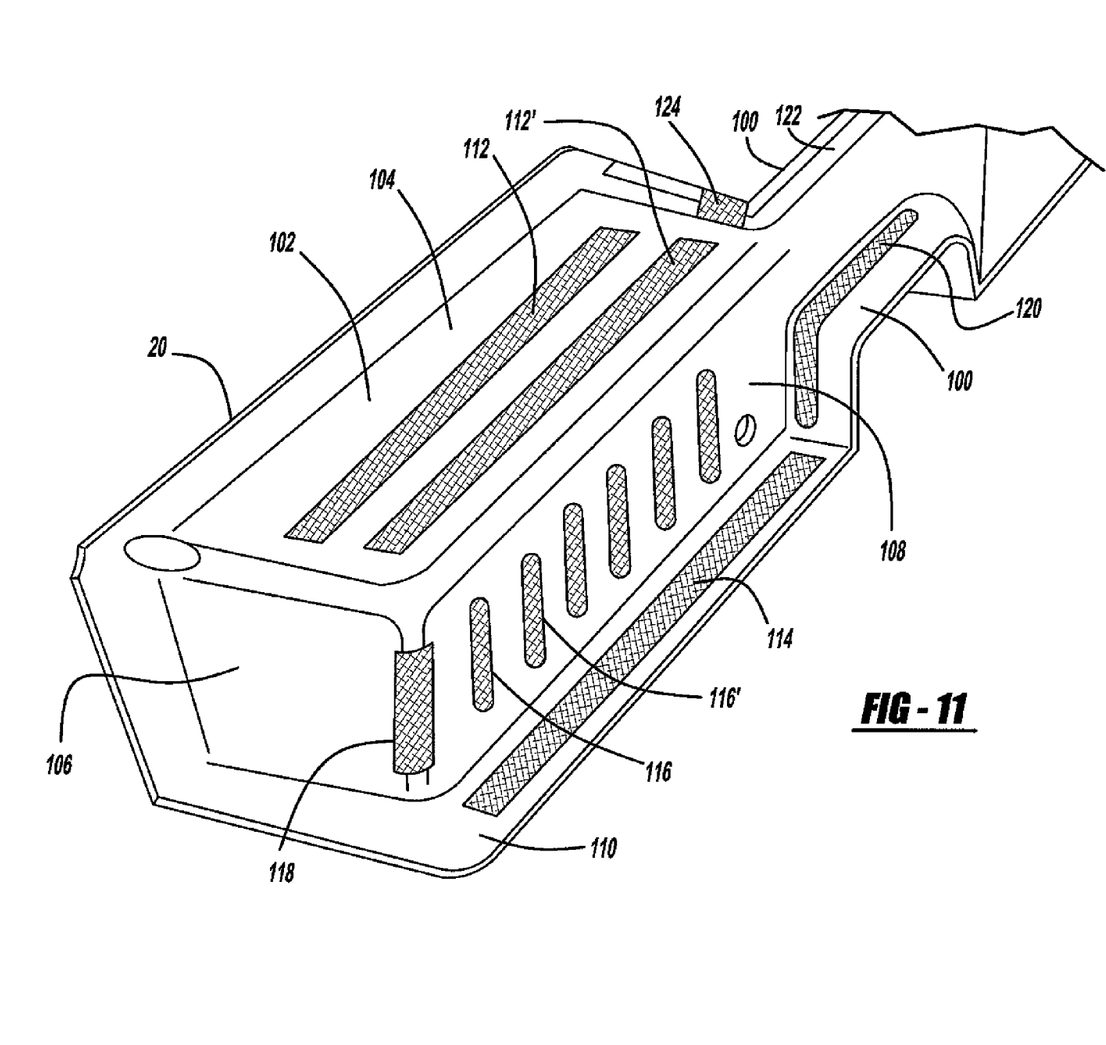
FIG. 11 illustrates a perspective view of a portion of the armrest substrate.

With reference to FIG. 11, a perspective view of a portion of the armrest substrate 20 is illustrated. The armrest substrate 20 includes a grab handle cut out area 100 and a rearward armrest portion 102. The rearward armrest portion 102 includes a top side 104, a back end 106, a front side 108, and a front lip 110. In general, slots, holes and apertures of a variety of shapes and sizes may be formed through the armrest substrate 20 according to the desired buckling path. The illustrated slots, holes and apertures are suggestive only and are not intended as being limiting, as other shapes and configurations may be formed in different places on the armrest substrate 20.

By way of illustration, a plurality of elongated slots 112 and 112' are formed along the top side 104 of the armrest substrate 20. Ordinarily this area would be ribbed to provide structural integrity. The elongated slots 112 and 112' are provided in lieu of the ribs without sacrificing structural integrity while providing an area for buckling initiation. In addition, a slot 114 may be provided along the front lip 110. A plurality of vertical slots, for example, slots 116 and 116', may be formed on the front side 108 of the armrest substrate 20. To provide further or alternative buckling initiation a corner slot 118 may be formed as well.

The grab handle cut out area 100 may be strategically modified by removing the hard edge, by thinning the edge, or by forming an incline along the edge. Modifications may also include the formation of a buckling initiator slot 120 along the grab handle cut out area 100. An upstanding vertical flange 122 is provided. The upstanding vertical flange 122 may be slotted, cut, or removed entirely, based upon the desired buckle kinematics. This embodiment shows the elongated slot 112' to be approximately in-line with an upstanding vertical flange buckle initiator 124. Each of these approaches would enable focused buckling initiation in the event of a side impact.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A door assembly for use in a vehicle comprising:
   a material flow strap having an upper portion defining a first angle and an intermediate portion defining a second angle, said angles being different;
   an armrest substrate substantially attachable to said material flow strap, said armrest substrate having a bend initiator area formed therein;
   an energy absorbing foam portion placeable over said armrest substrate; and
   an armrest cover placeable over said energy absorbing foam portion.

2. The door assembly of claim 1 wherein said bend initiator area formed on said material flow strap is selected from the group consisting of a thinned area, a notched area, a slotted area, and a cut-out area.

3. The door assembly of claim 1 wherein said bend initiator area formed on said armrest substrate is selected from the group consisting of a thinned area, a notched area, a slotted area, and a cut-out area.

4. The door assembly of claim 1 wherein said upper portion of said material flow strap defines includes a substantially horizontal portion, said material flow strap further including a substantially perpendicular portion.

5. The door assembly of claim 4 wherein said material flow strap is a first material flow strap and said door assembly further includes a second material flow strap, said second material flow strap being perpendicular to said first material flow strap.

6. The door assembly of claim 1 wherein said armrest substrate has at least one bend initiator area formed thereon.

7. The door assembly of claim 6 wherein said at least one bend initiator area is taken from the group consisting of a thinned area, a notched area, a slotted area, and a cut-out area.

8. The door assembly of claim 6 wherein said armrest substrate has a long axis and wherein said bend initiator area is an elongated weakened area formed along said long axis.

9. The door assembly of claim 6 wherein said armrest substrate has a long axis and wherein said bend initiator area is an elongated weakened area formed perpendicular to said long axis.

10. A door assembly for use in a vehicle comprising:
    a material flow strap having a bend initiator area formed therein;
    an armrest substrate substantially attachable to said material flow strap, said armrest substrate having a bend initiator area formed therein;
    an energy absorbing foam portion placeable over said armrest substrate; and
    an armrest cover placeable over said energy absorbing foam portion; and
    a grab handle back side plate.

11. The door assembly of claim 10 wherein said grab handle back side plate includes a pair of spaced apart side arms.

12. The door assembly of claim 11 wherein each of said pair of spaced apart side arms includes at least one bend initiator area.

13. The door assembly of claim 12 wherein said at least one bend initiator area is taken from the group consisting of a thinned area, a notched area, a slotted area, and a cut-out area.

14. A support structure for a vehicle armrest, the support structure comprising:
    a material flow strap, said material flow strap having an upper portion defining a first angle, an intermediate portion defining a second angle, said first angle and said second angle being different, and a lower portion defining a third angle, said first angle and said third angle being substantially perpendicular;
    a door handle support attached to said material flow strap.

15. The support structure of claim 14 wherein said door handle support includes a bend initiator area.

16. The door assembly of claim 15 wherein said bend initiator area is taken from the group consisting of a thinned area, a notched area, a slotted area, and a cut-out area.

* * * * *